US012552117B2

(12) United States Patent
Beon et al.

(10) Patent No.: US 12,552,117 B2
(45) Date of Patent: Feb. 17, 2026

(54) POLARIZING FILM, METHOD OF MANUFACTURING POLARIZING FILM, AND DISPLAY APPARATUS INCLUDING POLARIZING FILM MANUFACTURED USING THE SAME

(71) Applicant: Samsung Display Co., Ltd., Yongin-si (KR)

(72) Inventors: Beonghun Beon, Yongin-si (KR); Dukjin Lee, Yongin-si (KR); Woosuk Jung, Yongin-si (KR); Hyosung Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/589,744

(22) Filed: Jan. 31, 2022

(65) Prior Publication Data
US 2022/0317357 A1 Oct. 6, 2022

(30) Foreign Application Priority Data
Apr. 5, 2021 (KR) ........................ 10-2021-0044298

(51) Int. Cl.
| G02B 5/30 | (2006.01) |
| B29D 11/00 | (2006.01) |
| B32B 7/12 | (2006.01) |
| B32B 27/30 | (2006.01) |
| G02B 1/04 | (2006.01) |
| H10K 59/12 | (2023.01) |
| H10K 59/40 | (2023.01) |
| B29K 629/00 | (2006.01) |
| H10K 59/80 | (2023.01) |

(52) U.S. Cl.
CPC .. *B29D 11/00644* (2013.01); *B29D 11/00894* (2013.01); *B32B 7/12* (2013.01); *B32B 27/306* (2013.01); *G02B 1/04* (2013.01); *G02B 5/3091* (2013.01); *H10K 59/12* (2023.02); *H10K 59/40* (2023.02); *B29K 2629/04* (2013.01); *B32B 2255/10* (2013.01); *B32B 2255/26* (2013.01); *B32B 2307/412* (2013.01); *B32B 2307/42* (2013.01); *B32B 2457/208* (2013.01); *H10K 59/8791* (2023.02)

(58) Field of Classification Search
None
See application file for complete search history.

(56) References Cited

U.S. PATENT DOCUMENTS

| 6,068,794 | A | 5/2000 | Kobayashi et al. |
| 7,839,569 | B2 | 11/2010 | Ohgaru et al. |
| 8,436,895 | B2 | 5/2013 | Kim et al. |

(Continued)

FOREIGN PATENT DOCUMENTS

| JP | 2002-022961 A | 1/2002 |
| JP | 3619915 B2 | 2/2005 |

(Continued)

*Primary Examiner* — Anthony J Frost
(74) *Attorney, Agent, or Firm* — Womble Bond Dickinson (US) LLP

(57) ABSTRACT

A polarizing film includes: a polarizing layer; a coating layer at one side of the polarizing layer and to absorb wavelengths in an ultraviolet ray region; and a phase retardation layer at another side of the polarizing layer, wherein the coating layer has a thickness of about 15 nm to about 5 μm.

5 Claims, 17 Drawing Sheets

(56) References Cited

U.S. PATENT DOCUMENTS

| | | | |
|---|---|---|---|
| 8,885,135 | B2 | 11/2014 | Park |
| 11,221,438 | B2 | 1/2022 | Lee et al. |
| 2004/0263777 | A1 | 12/2004 | Kim |
| 2007/0258141 | A1* | 11/2007 | Ohgaru ............... G02B 5/3016 359/487.02 |
| 2010/0092693 | A1 | 4/2010 | Park et al. |
| 2010/0104879 | A1 | 4/2010 | Okano |
| 2010/0141859 | A1 | 6/2010 | Park et al. |
| 2011/0096255 | A1 | 4/2011 | Rho et al. |
| 2012/0320317 | A1* | 12/2012 | Yoon .................... G02B 5/3041 359/483.01 |
| 2015/0146294 | A1* | 5/2015 | Watanabe ............... B32B 38/10 156/229 |
| 2015/0169107 | A1* | 6/2015 | Misaki .................. G06F 3/0446 345/174 |
| 2015/0192700 | A1 | 7/2015 | Won et al. |
| 2016/0291372 | A1 | 10/2016 | Byun et al. |
| 2019/0367720 | A1* | 12/2019 | Ge .......................... B32B 27/06 |
| 2021/0260851 | A1 | 8/2021 | Tomohisa et al. |

FOREIGN PATENT DOCUMENTS

| | | | | |
|---|---|---|---|---|
| JP | 2006-091374 | A | | 4/2006 |
| JP | 4785458 | B2 | | 10/2011 |
| JP | 5168278 | B2 | | 3/2013 |
| JP | 5321456 | B2 | | 10/2013 |
| JP | 2014-216329 | A | | 11/2014 |
| JP | 2014-216642 | A | | 11/2014 |
| JP | 5940876 | B2 | | 6/2016 |
| JP | 6021686 | B2 | | 11/2016 |
| JP | 6035964 | B2 | | 11/2016 |
| JP | WO15-098491 | S | | 3/2017 |
| JP | 6201755 | B2 | | 9/2017 |
| KR | 10-0399250 | B1 | | 9/2003 |
| KR | 10-0416924 | B1 | | 1/2004 |
| KR | 10-0445617 | B1 | | 11/2004 |
| KR | 10-2005-0003739 | A | | 1/2005 |
| KR | 10-0700409 | B1 | | 3/2007 |
| KR | 10-2007-0116309 | A | | 12/2007 |
| KR | 10-0820175 | B1 | | 4/2008 |
| KR | 10-0932049 | B1 | | 12/2009 |
| KR | 10-2010-0064215 | A | | 6/2010 |
| KR | 10-0967899 | B1 | | 7/2010 |
| KR | 10-2011-0046130 | A | | 5/2011 |
| KR | 10-2011-0119347 | A | | 11/2011 |
| KR | 10-1082056 | B1 | | 11/2011 |
| KR | 10-1265309 | B1 | | 5/2013 |
| KR | 10-1265310 | B1 | | 5/2013 |
| KR | 10-1445423 | B1 | | 9/2014 |
| KR | 10-2015-0082942 | A | | 7/2015 |
| KR | 10-1579340 | B1 | | 12/2015 |
| KR | 10-1611421 | B1 | | 4/2016 |
| KR | 10-2016-0090335 | A | | 7/2016 |
| KR | 10-2016-0117783 | A | | 10/2016 |
| KR | 10-1765372 | B1 | | 8/2017 |
| KR | 10-1913730 | B1 | | 10/2018 |
| KR | 10-2020-0102579 | A | | 9/2020 |
| KR | 10-2021-0025012 | A | | 3/2021 |
| TW | 201447431 | A | * 12/2014 | ............. G02B 5/305 |

\* cited by examiner

POLARIZING FILM, METHOD OF
MANUFACTURING POLARIZING FILM,
AND DISPLAY APPARATUS INCLUDING
POLARIZING FILM MANUFACTURED
USING THE SAME

CROSS-REFERENCE TO RELATED
APPLICATION

This application claims priority to and the benefit of Korean Patent Application No. 10-2021-0044298, filed on Apr. 5, 2021, in the Korean Intellectual Property Office, the entire disclosure of which is incorporated herein by reference.

BACKGROUND

1. Field

One or more embodiments relate to a polarizing film, a method of manufacturing the polarizing film, and a display apparatus including a polarizing member manufactured utilizing (e.g., using) the method, and more particularly, to a polarizing film having an excellent or desired ultraviolet ray blocking effect and capable of implementing a thin display apparatus, a method of manufacturing the polarizing film, and a display apparatus including a polarizing member manufactured utilizing (e.g., using) the method.

2. Description of the Related Art

A display apparatus implements an image and may include liquid crystal displays (LCDs), organic light-emitting display devices (OLEDs), electrophoretic displays (EPDs), and/or the like. The display apparatus includes a polarizing film to prevent or block light introduced from the outside from being reflected from a front surface of the display apparatus.

SUMMARY

Aspects of one or more embodiments of the present disclosure are directed towards a polarizing film with an excellent or desired ultraviolet ray blocking effect which is capable of implementing a display apparatus, a method of manufacturing the polarizing film, and a display apparatus including a polarizing film manufactured utilizing (e.g., using) the method. However, these aspects are examples and do not limit the scope of the present disclosure.

Additional aspects will be set forth in part in the description which follows and, in part, will be apparent from the description, or may be learned by practice of the embodiments of the present disclosure.

According to an embodiment, a polarizing film includes a polarizing layer, a coating layer at (e.g., on) one side of the polarizing layer and to absorb wavelengths in an ultraviolet ray region, and a phase retardation layer at (e.g., on) another side of the polarizing layer, wherein the coating layer has a thickness of about 15 nm to about 5 μm.

The coating layer may include (e.g., be) a poly vinyl alcohol-based resin and an ultraviolet-ray-absorbing monomer.

The ultraviolet-ray-absorbing monomer may include (e.g., be) at least one selected from a benzotriazole-based monomer, a triphenyltriazine-based monomer, and a benzophenone-based monomer.

The coating layer may include about 0.1 to about 20 parts by weight of the poly vinyl alcohol-based resin and the ultraviolet-ray-absorbing monomer based on 100 parts by weight of a coating layer composition for forming the coating layer.

The polarizing film may further include a protective layer between the polarizing layer and the phase retardation layer.

According to an embodiment, a method of manufacturing a polarizing film may include stretching a poly vinyl alcohol-based resin film, dyeing the poly vinyl alcohol-based resin film, coupling (e.g., attaching) a first protective layer and a second protective layer at (e.g., on) one surface and another surface of the poly vinyl alcohol-based resin film, respectively, drying the first protective layer and the second protective layer, peeling off the first protective layer, forming a coating layer for absorbing wavelengths in an ultraviolet ray region at (e.g., on) the one surface of the poly vinyl alcohol-based resin film from which the first protective layer is peeled off, and coupling (e.g., attaching) a phase retardation layer at (e.g., on) the other surface of a poly vinyl alcohol-based resin film.

The forming of the coating layer may be performed before or after the coupling (e.g., attaching) of the phase retardation layer.

The forming of the coating layer may include forming a coating layer composition by mixing a poly vinyl alcohol-based resin, an ultraviolet-ray-absorbing monomer, and a solvent, coating the coating layer composition at (e.g., on) the one surface of the poly vinyl alcohol-based resin film from which the first protective layer is peeled off, and drying the coating layer composition.

The coating layer composition may include about 0.1 to about 20 parts by weight of a sum of the poly vinyl alcohol-based resin and the ultraviolet-ray-absorbing monomer based on 100 parts by weight of the coating layer composition.

The coupling (e.g., attaching) of the first protective layer may include coupling (e.g., attaching) the first protective layer at (e.g., on) the one surface of the poly vinyl alcohol-based resin film by spraying de-ionized (DI) water between the poly vinyl alcohol-based resin film and the first protective layer.

The coupling (e.g., attaching) of the second protective layer may include coupling (e.g., attaching) the second protective layer at (e.g., on) the other surface of the poly vinyl alcohol-based resin film by spraying an adhesive agent between the poly vinyl alcohol-based resin film and the second protective layer.

The coupling (e.g., attaching) of the second protective layer may include coupling (e.g., attaching) the second protective layer at (e.g., on) the other surface of the poly vinyl alcohol-based resin film by spraying DI water between the poly vinyl alcohol-based resin film and the second protective layer, and the method may further include peeling off the second protective layer.

According to an embodiment, a display apparatus may include a display panel including a display element, an input detection layer on the display panel, a polarizing film on the input detection layer, a window layer on the polarizing film, a first adhesive layer between the input detection layer and the polarizing film, and a second adhesive layer between the polarizing film and the window layer, wherein the polarizing film includes a polarizing layer, a coating layer at (e.g., on) one side of the polarizing layer and to absorb wavelengths in an ultraviolet ray region, and a phase retardation layer at (e.g., on) another side of the polarizing layer, and the coating layer has a thickness of about 15 nm to about 5 μm.

The second adhesive layer may be in direct contact with the coating layer.

Only the coating layer may be between the second adhesive layer and the polarizing layer.

The polarizing film may further include a protective layer between the polarizing layer and the phase retardation layer.

The display apparatus may further include an adhesive film between the phase retardation layer and the polarizing layer, and another surface of the polarizing layer may be in direct contact with the adhesive film.

The coating layer may include (e.g., be) a poly vinyl alcohol-based resin and an ultraviolet-ray-absorbing monomer.

The ultraviolet-ray-absorbing monomer may include (e.g., be) at least one selected from a benzotriazole-based monomer, a triphenyltriazine-based monomer, and a benzophenone-based monomer.

The coating layer may include about 0.1 to about 20 parts by weight of a sum of the poly vinyl alcohol-based resin and the ultraviolet-ray-absorbing monomer based on 100 parts by weight of a coating layer composition for forming the coating layer.

These and/or other aspects will become apparent and more readily appreciated from the following detailed description of the embodiments, the accompanying drawings, and claims.

These general and specific aspects may be carried out utilizing (e.g., using) a system, a method, a computer program, or any combination thereof.

BRIEF DESCRIPTION OF THE DRAWINGS

The above and other aspects and features of certain embodiments will be more apparent from the following description taken in conjunction with the accompanying drawings, in which.

DETAILED DESCRIPTION

Figure 1:
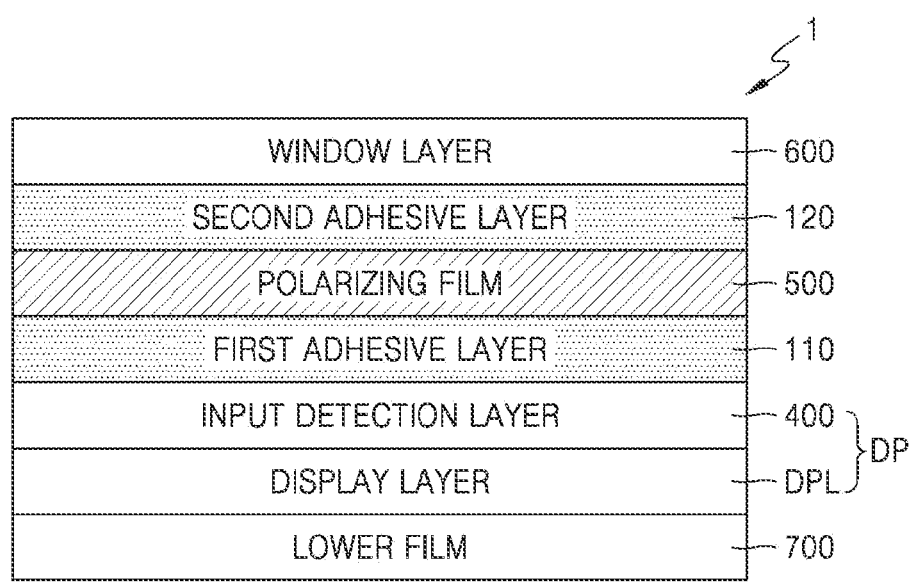
FIG. 1 is a cross-sectional view schematically illustrating a stacked structure of a display apparatus according to an embodiment.

Reference will now be made in more detail to embodiments, examples of which are illustrated in the accompanying drawings, wherein like reference numerals refer to like elements throughout the present disclosure. In this regard, the present embodiments may have different forms and/or configurations, and should not be construed as being limited to the descriptions set forth herein. Accordingly, the embodiments are merely described below, by referring to the drawings, to explain aspects of the present disclosure. As used herein, the term "and/or" includes any and all combinations of one or more of the associated listed items. Throughout the present disclosure, the expression "at least one of a, b or c" indicates only a, only b, only c, both a and b, both a and c, both b and c, all of a, b, and c, or any variations thereof.

Because the present disclosure may have diverse modified embodiments, embodiments are illustrated in the drawings and are described with respect to the embodiments. An aspect, a feature, and/or a characteristic of the present disclosure, and a method of accomplishing them will be apparent by referring to embodiments described with reference to the drawings. The present disclosure may, however, be embodied in many different forms and/or configurations and should not be construed as limited to the embodiments set forth herein. As used herein, the use of the term "may," when describing embodiments of the present disclosure, refers to "one or more embodiments of the present disclosure."

One or more embodiments of the present disclosure will be described below in more detail with reference to the accompanying drawings. Components that are the same or are in correspondence with each other are rendered the same reference numeral regardless of the figure number, and redundant explanations may not be provided.

While such terms as "first," "second," etc., may be used to describe various components, such components are not to be limited to the above terms. The above terms are used only to distinguish one component from another component.

An expression used in the singular encompasses an expression of the plural unless the context expressly indicates otherwise.

It will be understood that the terms "comprises," "comprising," and similar terms used herein specify the presence of stated features and/or elements, but do not preclude the presence or addition of one or more other features and/or elements.

It will be further understood that when a layer, area, region, or element is referred to as being "formed on" another layer, area, region, or element, it can be directly or indirectly formed on the other layer, area, region, or element. For example, one or more intervening layers, areas, regions, or elements may be present therebetween.

It will be understood that when a layer, region, or component is referred to as being coupled (e.g., connected) to another layer, region, or component, it can be directly or indirectly coupled (e.g., connected) to the other layer, region, or component. For example, one or more intervening layers, regions, or components may be present. For example, when layers, areas, regions, or elements or the like are referred to as being "electrically coupled" or "electrically connected," they may be directly electrically coupled or electrically connected, or the layers, areas, regions, or elements may be indirectly electrically coupled or indirectly electrically connected, and one or more intervening layers, areas, regions, components, or the like may be present therebetween.

In the present disclosure, the term "and/or" includes any and all combinations of one or more of the associated listed items. For example, "A and/or B" may include "A," "B," or "A and B." Throughout the present disclosure, the expression "at least one of a, b or c" indicates only a, only b, only c, both a and b, both a and c, both b and c, all of a, b, and c, or any variations thereof.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

In the following examples, the x-axis, the y-axis, and the z-axis are not limited to three axes of a rectangular coordinate system, and may be interpreted in a broader sense. For example, the x-axis, the y-axis, and the z-axis may be normal (e.g., perpendicular) to one another, or may represent different directions that are not normal (e.g., not perpendicular) to one another.

In the present disclosure, when an embodiment may be implemented differently, a certain process order may be performed differently from the described order. For example, two consecutively described processes may be performed substantially at the same time or performed in an order opposite to the described order.

As used herein, the term "substantially" and similar terms are used as terms of approximation and not as terms of degree, and are intended to account for the inherent deviations in measured or calculated values that would be recognized by those of ordinary skill in the art. Also, the terms "about," "approximately," and similar terms, when used herein in connection with a numerical value or a numerical range, are inclusive of the stated value and mean within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Sizes of elements in the drawings may be exaggerated or reduced for convenience of explanation. For example, because sizes and thicknesses of components in the drawings may be exaggerated or reduced for convenience of explanation, the following embodiments are not limited thereto.

FIG. 1 is a cross-sectional view schematically illustrating a stacked structure of a display apparatus 1 according to an embodiment.

Referring to FIG. 1, the display apparatus 1 according to an embodiment may include a display layer DPL, an input detection layer 400, a polarizing film 500, and a window layer 600. At least some elements from among the display layer DPL, the input detection layer 400, the polarizing film 500, and the window layer 600 may be formed by a continuous process, or at least some elements may be coupled to each other utilizing (e.g., using) an adhesive member. In FIG. 1, as adhesive members, a first adhesive layer 110 may be between the input detection layer 400 and the polarizing film 500, and a second adhesive layer 120 may be between the polarizing film 500 and the window layer 600. For example, the first adhesive layer 110 and the second adhesive layer 120 may include (e.g., be) optical clear adhesives (OCAs). The adhesive member described hereinbelow may include (e.g., be) a common adhesive and/or a pressure-sensitive adhesive.

The display layer DPL may include an organic light-emitting diode (OLED) as a display element. The display layer DPL may generate an image through the organic light-emitting diode, and display the generated image to the outside.

The input detection layer 400 may be directly arranged on the display layer DPL. In the present disclosure, "a feature B is directly arranged on a feature A" may refer to an embodiment where an additional adhesive layer or adhesive member is not present between the feature A and the feature B. After the feature A is formed, the feature B may be formed on a base surface provided in the feature A through a continuous process.

A display panel DP may include the display layer DPL and the input detection layer 400 arranged directly on the display layer DPL, and may be defined thereby.

The input detection layer 400 may obtain coordinate information of an external input (for example, a touch event). The display apparatus 1 according to an embodiment may further include a lower film 700 on a lower surface of the display panel DP. In some embodiments, the lower film 700 and the display panel DP may be coupled to each other utilizing (e.g., using) a pressure-sensitive adhesive layer. In some embodiments, the lower film 700 may include (e.g., be) polyethylene naphthalate, polyethylene terephthalate, polyphenylene sulfide, and/or the like.

According to an embodiment, the display panel DP may include an emission-type (e.g., emission-kind or emission-based) display panel, but is not limited thereto. For example, the display panel DP may include an organic light-emitting display panel and/or a quantum dot light-emitting display panel. An emission layer of the organic light-emitting display panel may include (e.g., be) an organic light-emitting material. An emission layer of the quantum dot light-emitting display panel may include a quantum dot, a quantum dot rod, and/or the like. Hereinafter, the display panel DP is described as an organic light-emitting display panel.

The polarizing film 500 may reduce the reflectivity of external light incident from an upper side of the window layer 600. According to an embodiment, the polarizing film 500 may include a coating layer 520 (see FIG. 2, etc.) which reduces a thickness of the polarizing film 500 and has excellent effectiveness in blocking ultraviolet rays from among the external light. The polarizing film 500 will be described in more detail below.

Figure 2:
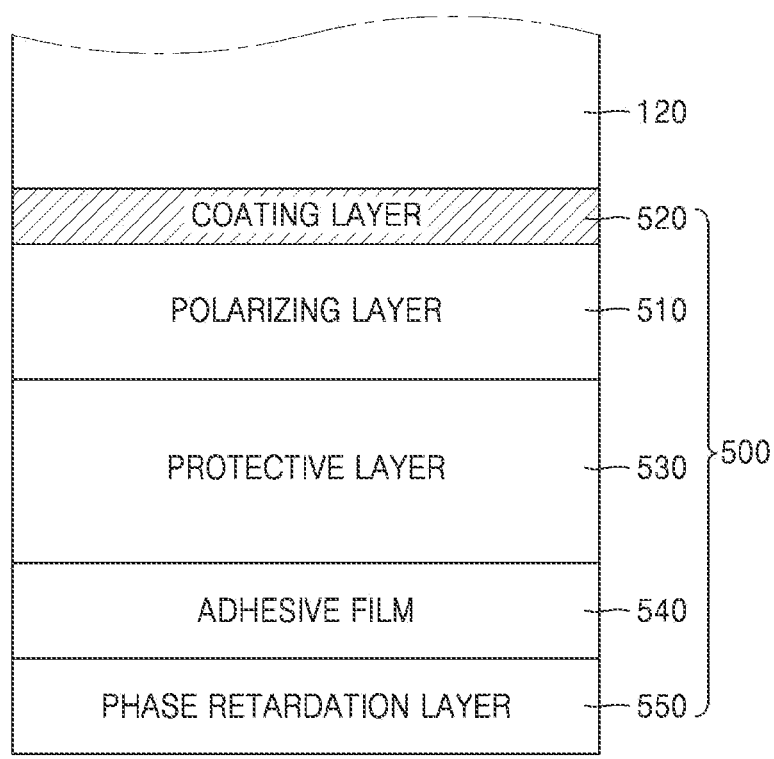
FIGS. 2 and 3 are each a cross-sectional view schematically illustrating a stacked structure of a polarizing film according to an embodiment.
Figure 3:
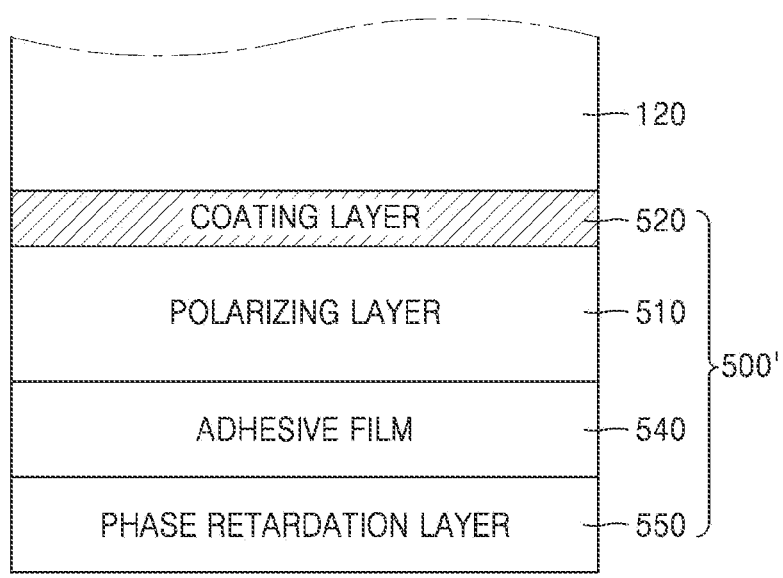

FIGS. 2 and 3 are each a cross-sectional view schematically illustrating a stacked structure of polarizing films 500 and 500' according to an embodiment.

Referring to FIG. 2, the polarizing film 500 according to an embodiment may include a polarizing layer 510, a coating layer 520, a protective layer 530, and a phase retardation layer 550.

The polarizing layer 510 may include a polarizer and may be to polarize light incident from a light source in the same direction as a polarizing axis (e.g., a polarizing axis of the polarizer). For example, the polarizing layer 510 may include a film-type (e.g., film-kind or film-based) polarizing layer, and may include (e.g., be) a stretchable synthetic resin film. The polarizing layer 510 may include a poly vinyl alcohol (PVA) film including a polarizer and/or a dichroic dye. The dichroic dye may include iodine molecules and/or dye molecules.

The polarizing layer 510 may be formed by stretching the PVA film in one direction and dipping the stretched PVA film in a solution including (e.g., being) iodine (iodine molecules) and/or a dichroic dye. In this case, iodine molecules and/or dichroic dye molecules may be arranged in parallel in a stretching direction. The iodine molecules and/or the dye molecules may have dichroic properties, and thus, may absorb light oscillating in the stretching direction and transmit light oscillating in a direction normal (e.g., perpendicular) to the stretching direction.

The coating layer 520 may be directly arranged on one surface of the polarizing layer 510. This may refer to how the coating layer 520 is directly formed on the PVA film included in the polarizing layer 510. The coating layer 520 may be provided by mixing a polymer resin with an ultraviolet-ray-absorbing monomer. For example, the polymer resin may include (e.g., be) a PVA. For example, the ultraviolet-ray-absorbing monomer may include (e.g., be) at least one selected from a benzotriazole-based monomer, triphenyltriazine-based monomer, and a benzophenone-based monomer. These ultraviolet-ray-absorbing monomers may prevent, or reduce the occurrence of, radicals in the OH group and/or the alcohol group of the PVA from being formed due to UV absorption, and may thus prevent, or reduce the occurrence of, the PVA from becoming polyene.

In a comparative example, when the coating layer 520 to block ultraviolet rays is not provided, an $I_1^-$ ion included in the dichroic dye with which the PVA is dyed absorbs the ultraviolet ray and then emits heat, an 15 absorbs the accumulated heat, and a chemical reaction occurs as shown in [Chemical Formula 1] below.

$$I_5^- \rightarrow I_3^- + I_2 \quad \text{[Chemical Formula 1]}$$

Polyenylation of the PVA may be induced by $I_2$ generated by such ion species modification. In some embodiments, an ultraviolet ray may directly form radicals in the OH bond of the PVA and induce a double bond, thereby inducing polyenylation.

Thus, according to an embodiment, the polarizing film 500 includes the coating layer 520 directly on one surface of the polarizing layer 510, and thus, polyenylation of the PVA due to ultraviolet ray absorption may be effectively prevented or reduced.

In a comparative example, it may be assumed that, to block an ultraviolet ray irradiated on the polarizing layer 510, a film-type (e.g., film-kind or film-based) protective member such as the protective layer 530 to be described later may be arranged on the polarizing layer 510, thereby implementing an ultraviolet ray blocking effect. However, the protective member may include (e.g., be) a material such as tri-acetyl cellulous (TAC), cyclo olefin polymer (COP), poly(methyl methacrylate) (PMMA), and/or polyethylene terephthalate (PET), and thus, a thickness thereof is large and a thickness of the entire polarizing film increases, which may act as a limit point in reducing a thickness of the display apparatus. Thus, in the polarizing film 500 according to an embodiment, the coating layer 520 including (e.g., being) the polymer resin including (e.g., being) the ultraviolet-ray-absorbing monomer may be directly arranged on the polarizing layer 510 utilizing (e.g., using) a coating method, instead of the protective layer, thereby reducing the thickness to about ½ to about ⅕ or less that of the protective member. For example, the thickness of the coating layer 520 may be about ½ to about ⅕ or less of the thickness of the protective member. In some embodiments, the thickness of the coating layer 520 may be about ⅕ or greater to about ½ or less of the thickness of the protective member.

In an embodiment, the thickness of the coating layer 520 may be about 15 μm. In some embodiments, the thickness of the coating layer 520 may be about 15 nm or greater to about 15 μm or less. When forming the film utilizing (e.g., using) the coating method, a maximum or largest thickness that may be implemented may be measured to be about 15 μm, and a minimum or smallest thickness that may be implemented may be measured to be about 15 nm, and thus, the coating layer 520 according to an embodiment may have a thickness of between about 15 nm to about 15 μm inclusive. The coating layer 520 may include an ultraviolet-ray-absorbing monomer in addition to the PVA-based resin, and thus, a thickness of the coating layer 520 may be controlled to have a value between about 15 nm to about 15 μm according to a parts-by-weight value of the ultraviolet-ray-absorbing monomer. In an embodiment, it was found that an ultraviolet ray blocking effect intended by the present disclosure is sufficiently shown, even when the thickness of the coating layer 520 is implemented to be about 5 μm or less. Thus, for example, the coating layer 520 may have a thickness of about 15 nm to about 5 μm.

The protective layer 530 may be arranged on another surface side of the polarizing layer 510. The protective layer 530 may support the polarizing layer 510 to supplement a mechanical strength of the polarizing layer 510. In addition, the protective layer 530 may prevent, or reduce the occurrence of, the polarizing layer 510 from being deformed according to a change in temperature and/or humidity. In an embodiment, the protective layer 530 may be arranged on a lower surface of the polarizing layer 510 or may be omitted as in FIG. 3. In some embodiments, the protective layer 530 and the polarizing layer 510 may adhere to each other utilizing (e.g., using) an aqueous adhesive material. In an embodiment, the protective layer 530 may include (e.g., be) TAC, COP, PMMA, and/or the like.

The phase retardation layer 550 may be arranged on a lower surface of the protective layer 530. An adhesive film 540 may be between the protective layer 530 and the phase retardation layer 550. The adhesive film 540 may include a pressure sensitive adhesive (PSA), for example, an OCA.

The phase retardation layer 550 may include a retarder. The retarder may include a film-type (e.g., film-kind or film-based) retarder and/or a liquid coating-type (e.g., liquid coating-kind or liquid coating-based) retarder, and may include a λ/2 retarder and/or a λ/4 retarder.

Meanwhile, referring to FIG. 3, the protective layer 530 may be omitted in the polarizing film 500'. As shown in FIG. 3, the polarizing film 500' may include the coating layer 520 on one surface of the polarizing layer 510, and the adhesive film 540 for coupling (e.g., attaching) the phase retardation layer 550 may be directly arranged on another surface of the polarizing layer 510. As described with reference to FIG. 2, the protective layer 530 supports the polarizing layer 510 to assign and/or provide a mechanical strength to the polarizing film 500, but the protective layer 530 itself is thicker than the other members, and thus may act as a limit in reducing the thickness of the polarizing film 500. Thus, in the polarizing film 500' of FIG. 3, the phase retardation layer 550 may be directly coupled (e.g., directly attached) or coupled (e.g., attached) on the other surface of the polarizing layer 510, thereby reducing the thickness of the polarizing film 500' itself.

Referring to FIGS. 2 and 3 together, the second adhesive layer 120 for bonding to the window layer 600 may be arranged on the coating layer 520. The second adhesive layer 120 may be directly arranged on the coating layer 520, and one surface of the coating layer 520 may be in direct contact with the second adhesive layer 120. This may refer to embodiments where an additional protective member, such as the protective layer 530 of FIG. 2, is not arranged on the coating layer 520.

Figure 4:
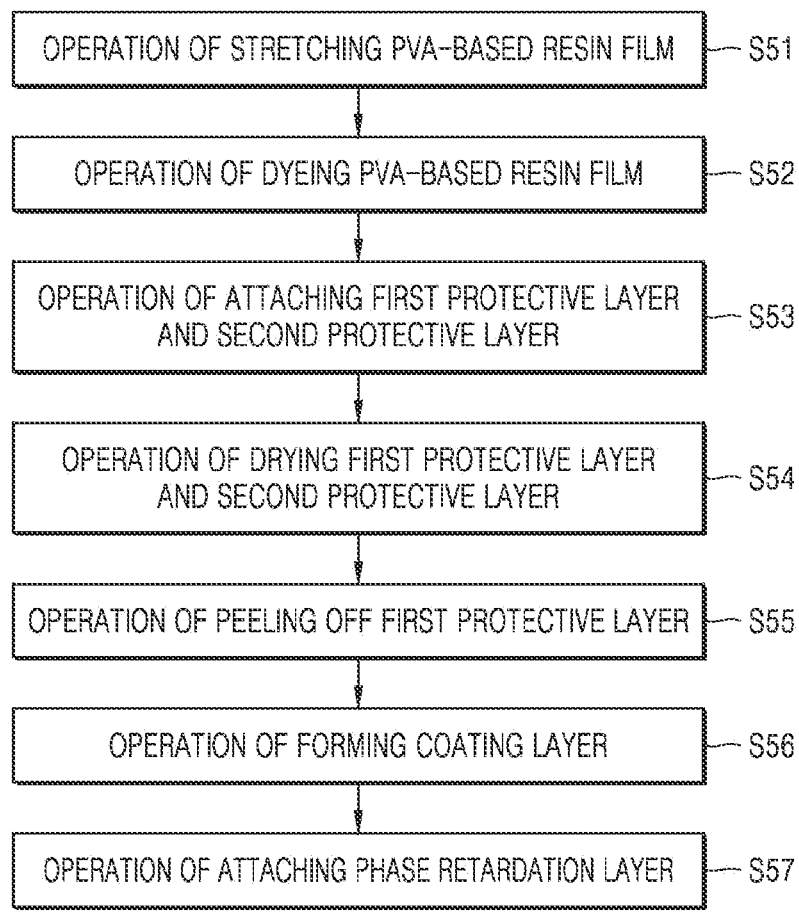
FIG. 4 is a flowchart of a method of manufacturing a polarizing film, according to an embodiment.
Figure 5:
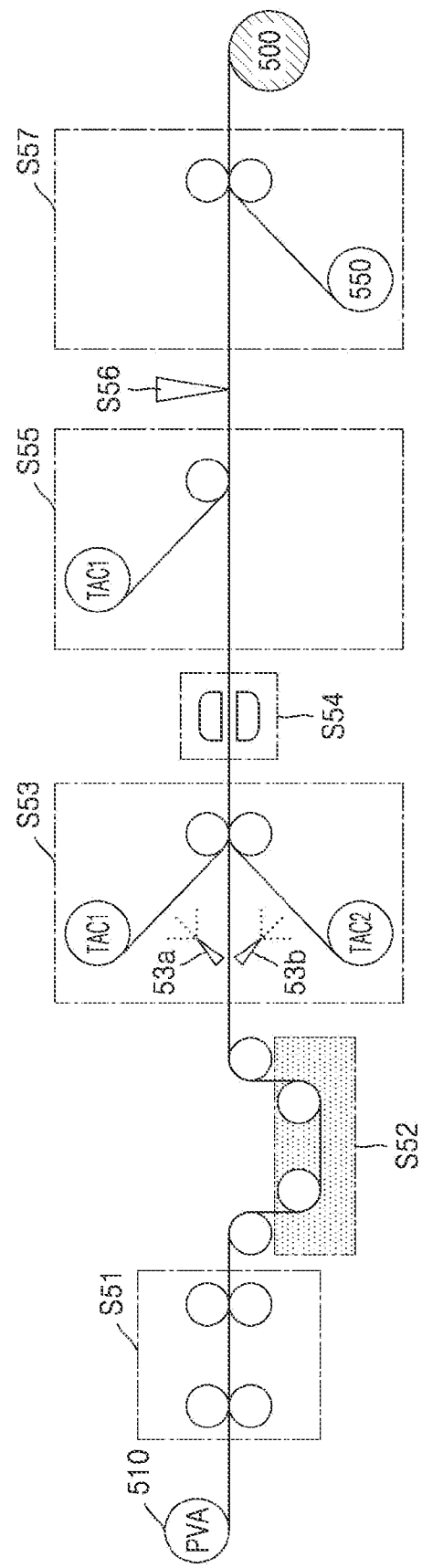
FIG. 5 is a conceptual diagram schematically illustrating a process of manufacturing a polarizing film, according to an embodiment.

FIG. 4 is a flowchart of a method of manufacturing a polarizing film, according to an embodiment, and FIG. 5 is a conceptual diagram schematically illustrating a process of manufacturing a polarizing film according to an embodiment.

Referring to FIGS. 4 and 5, first, an operation (S51) of preparing a PVA-based resin film included in (e.g., forming) the polarizing layer 510 and stretching the PVA-based resin film may be performed. As described above, the polarizing layer 510 according to an embodiment may include, for example, a PVA-based resin.

Then, an operation (S52) of dyeing the PVA-based resin may be performed. The dyeing operation (S52) may involve a dichroic dye. The dichroic dye may include iodine molecules and/or dye molecules.

The polarizing layer 510 may be formed by stretching the PVA-based resin film in one direction and dipping the stretched PVA-based resin film in a solution of iodine and/or a dichroic dye. In this case, the iodine molecules and/or the dichroic dye molecules may be arranged side by side in the stretching direction. The iodine molecules and the dye molecules exhibit dichroic properties, and thus, light oscillating in the stretching direction may be absorbed, and light oscillating in a direction normal (e.g., perpendicular) to the stretching direction may be transmitted.

Then, an operation (S53) of coupling (e.g., attaching) a first protective layer TAC1 and a second protective layer TAC2 at (e.g., on or to) one surface and another surface of the dyed PVA-based resin film, respectively, may be performed. The first protective layer TAC1 is a layer that is temporarily coupled (e.g., temporarily attached) during a process to later form the coating layer 520, and may be coupled (e.g., attached) by spraying, for example, de-ionized (DI) water and/or the like, to the one surface of the PVA-based resin film (e.g., the dyed PVA-based resin film) through a first spray nozzle 53a and utilizing (e.g., using) the sprayed DI water as a medium. The DI water does not substantially have an adhesive force, and thus may be easily utilized (e.g., used) to detach the first protective layer TAC1 in a subsequent process.

The second protective layer TAC2 may be coupled (e.g., attached) by spraying, for example, an aqueous adhesive agent, to the other surface of the PVA-based resin film through a second spray nozzle 53b and utilizing (e.g., using) the sprayed aqueous adhesive agent as a medium. The second protective layer TAC2 may be provided as the protective layer 530 of FIG. 2 described above.

After the operation (S53) of coupling (e.g., attaching) the first protective layer TAC1 and the second protective layer TAC2, an operation (S54) of drying the first protective layer TAC1 and the second protective layer TAC2 may be performed. In this process, the DI water and the aqueous adhesive agent sprayed through the first spray nozzle 53a and the second spray nozzle 53b, respectively, may be dried.

Then, an operation (S55) of peeling off the first protective layer TAC1 may be performed. The first protective layer TAC1 performs a function of supporting the PVA-based resin film in the process of coupling (e.g., attaching) the second protective layer TAC2, and by removing the first protective layer TAC1, the coating layer 520 may be directly formed on the PVA-based resin film.

In a comparative example, the polarizing film may have the first protective layer TAC1 in which an ultraviolet ray blocking material is included, thereby blocking an ultraviolet ray. However, the first protective layer TAC1 has a thickness of about two to five times greater than that of the coating layer 520 according to an embodiment, and thus may act as a limit in reducing the thickness of the polarizing film.

Then, an operation (S56) of forming the coating layer 520 for absorbing wavelengths in an ultraviolet ray region on the one surface of the PVA-based resin film from which the first protective layer TAC1 is peeled off may be performed. In an embodiment, the operation (S56) of forming the coating layer 520 may be performed before or after an operation (S57) of coupling (e.g., attaching) the phase retardation layer 550. FIGS. 4 and 5 show that a process of performing the operation (S56) of forming the coating layer 520 is performed before the operation (S57) of coupling (e.g., attaching) the phase retardation layer 550.

After the operation (S56) of forming the coating layer 520, the operation (S57) of coupling (e.g., attaching) the phase retardation layer 550 on a surface opposite to the surface on which the coating layer 520 is formed, for example, the other surface of the PVA-based resin film, may be performed. For example, the phase retardation layer 550 may be coupled (e.g., attached) to an opposite side of the second protective layer TAC2 (e.g., to an opposite side of the protective layer 530) as the second protective layer TAC2 is on. The operation (S57) of coupling (e.g., attaching) the phase retardation layer 550 may include coupling (e.g., attaching) the phase retardation layer 550 on the other surface of the PVA-based resin film with the adhesive film 540 as a medium.

Figure 6:
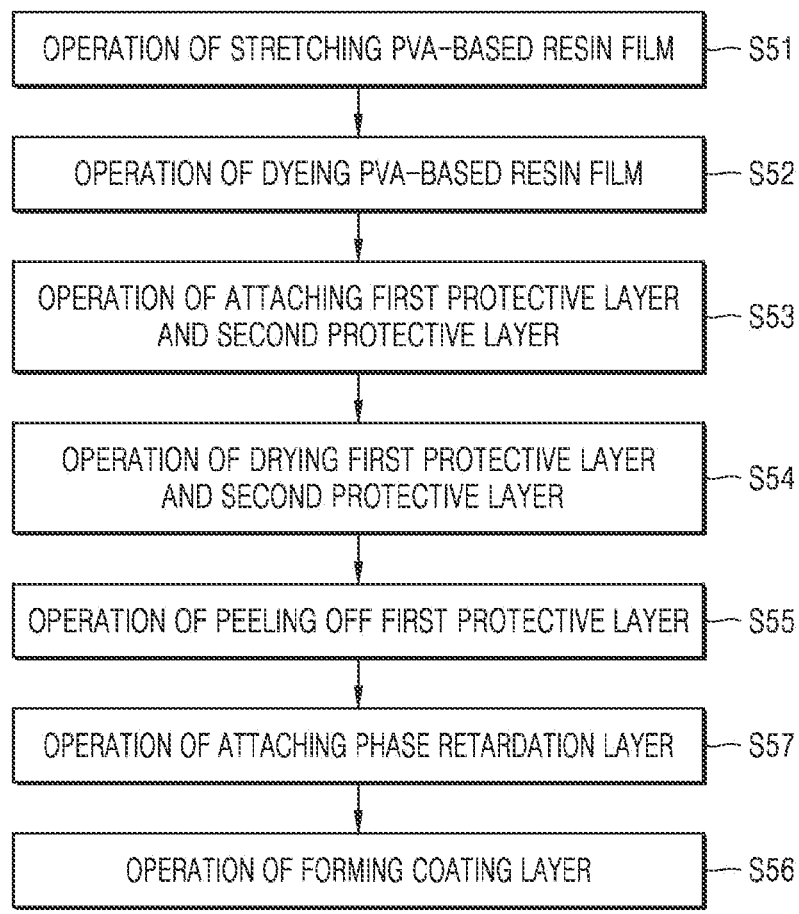
FIG. 6 is a flowchart of a method of manufacturing a polarizing film, according to an embodiment.
Figure 7:
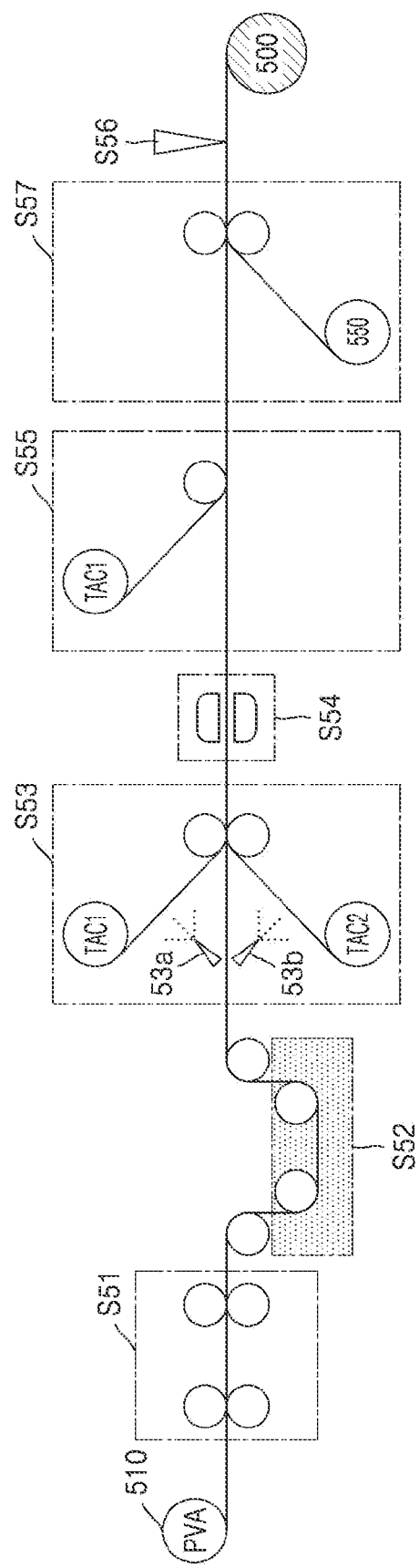
FIG. 7 is a conceptual diagram schematically illustrating a process of manufacturing a polarizing film, according to an embodiment.

FIG. 6 is a flowchart of a method of manufacturing a polarizing film, according to an embodiment, and FIG. 7 is a conceptual diagram schematically illustrating a process of manufacturing a polarizing film, according to an embodiment.

A manufacturing process of FIGS. 6 and 7 is substantially the same as that of FIGS. 4 and 5, but differs from the above-described process with respect to a point at which the operation (S56) of forming the coating layer 520 is performed. For example, the sequence in which the operation (S56) occurs relative to the other operations in the manufacturing process of FIGS. 6 and 7 is different compared to the manufacturing process of FIGS. 4 and 5.

In the present embodiment, the operation (S56) of forming the coating layer 520 may be performed after the operation (S57) of coupling (e.g., attaching) the phase retardation layer 550. However, after the operation (S57) of coupling (e.g., attaching) the phase retardation layer 550, a process of drying the adhesive film 540 for coupling (e.g., attaching) the phase retardation layer 550 may be added, and the one surface of the PVA-based resin film from which the first protective layer TAC1 is removed (e.g., peeled off from) may be damaged in a process of laminating the phase retardation layer 550, and thus, it may be advantageous to perform the operation (S56) of forming the coating layer 520 prior to the operation (S57) of coupling (e.g., attaching) the phase retardation layer 550. In some embodiments, the process of drying the adhesive film 540 may be performed after the operation (S57) of coupling (e.g., attaching) the phase retardation layer 550 and before the operation (S56) of forming the coating layer 520.

Figure 8:
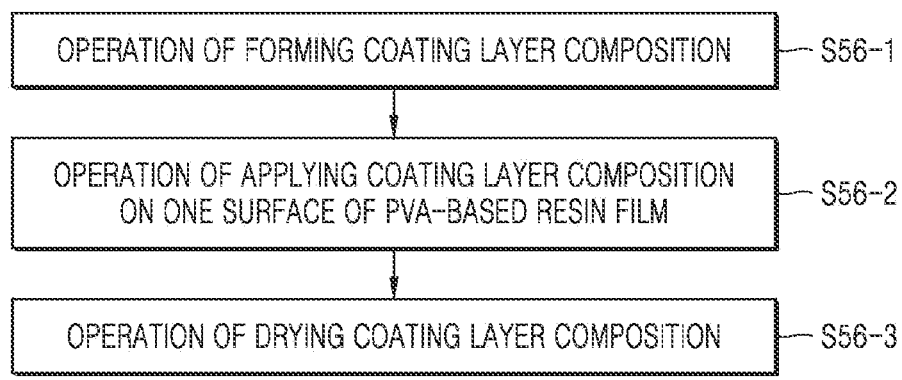
FIG. 8 is a flowchart of an operation of forming a coating layer, according to an embodiment.

FIG. 8 is a flowchart of an operation of forming a coating layer, according to an embodiment.

Referring to FIG. 8, first, an operation (S56-1) of forming a coating layer composition by mixing a PVA-based resin, an ultraviolet absorbing monomer (e.g., ultraviolet-ray-absorbing monomer), and a solvent may be performed. The coating layer composition may form a liquefied composition by putting the PVA-based resin, the ultraviolet-ray-absorbing monomer, and the solvent in a tank and stirring the same.

The PVA-based resin may include, for example, at least one selected from PVA, polyvinyl acetate, and a saponified product of a copolymer of vinyl acetate and copolymerizable monomer. The PVA-based resin may form a copolymer with an unsaturated carboxylic acid, such as ethylene (anhydrous) maleic acid, fumaric acid, crotonic acid, itaconic acid, (meth)acrylic acid, and/or the like, and/or esters thereof; and/or α-olefin such as ethylene, propylene, (meth)allyl sulfonic acid (soda), sulfonic acid soda (monoalkyl maleate), disulfonic acid soda alkyl maleate, N-Methyloacrylamide, acrylamide alkyl sulfonic acid alkali salt, N-vinylpyrrolidone, and/or the like. In an embodiment, the PVA-based resin may be utilized (e.g., used) by mixing two or more of the materials described above.

In addition, the PVA-based resin may include a modified PVA-based resin including a side chain including a hydrophilic functional group. For example, the hydrophilic functional group may include (e.g., be) an acetoacetyl group, a carbonyl group, or the like. In addition, a modified PVA generated by acetalating, urethanizing, etherfying, grafting, phosphoric acid esterifying the PVA-based resin may be utilized (e.g., used).

For example, the ultraviolet-ray-absorbing monomer may include (e.g., be) at least one selected from a benzotriazole-based monomer, a triphenyl triazine-based monomer, and a benzophenone-based monomer.

In an embodiment, the coating layer composition may include about 0.1 to about 20 parts by weight of a sum of the PVA-based resin and the ultraviolet-ray-absorbing monomer based on 100 parts by weight of the coating layer composition. In this case, the PVA-based resin may be included in a larger amount than the ultraviolet-ray-absorbing monomer. In an embodiment, the ultraviolet-ray-absorbing monomer may be included in an amount of about 0.1 to about 5 parts by weight. For example, in the coating layer composition, a solvent may be included in a large amount over about 80 parts by weight. According to an embodiment, the coating layer 520 may have a thickness of about 15 nm to about 15 μm inclusive. In some embodiments, the coating layer 520 may have a thickness of about 5 μm or less. To this end, it is important to appropriately adjust a weight ratio of the PVA-based resin and the ultraviolet absorbing monomer to the solvent. When the PVA-based resin and the ultraviolet-ray-absorbing monomer are included (e.g., collectively included) in a weight ratio of 20 parts by weight or more, the spreadability of the coating layer composition is not good, and thus, the coating layer may be formed to have a thickness of more than 15 μm.

The solvent may include, for example, polyhydric alcohol such as ethylene glycol, glycerin, and/or the like, and water as a plasticizer.

Meanwhile, a compound having at least two functional groups which is reactant with the PVA-based resin may be further included as a cross-linking agent. For example, the cross-linking agent may include (e.g., be) alkylenediamines, isocyanates, epoxies, dialdehyde, amino-formaldehyde resin, dicarboxylic acid dihydrazide, aqueous dihydrazine, and/or salt of divalent or trivalent metal such as sodium, potassium, magnesium, calcium, aluminum, iron, nickel, or the like, and/or the oxide thereof. In an embodiment, the cross-linking agent may include melamine methylol as an amino-formaldehyde resin.

After the coating layer composition is formed, an operation (S56-2) of coating or applying the coating layer composition on the one surface of the PVA-based resin film from which the first protective layer TAC1 is peeled off may be performed. In this case, the coating or applying method may include various suitable methods such as roll coating, microgravure coating, spin coating, wire bar coating, dip coating, die coating, curtain coating, spray coating, knife (comma) coating, slot die coating, and/or the like.

Then, an operation (S56-3) of drying the coating layer composition may be performed. A hot air drying method may be utilized (e.g., used) in the drying, but the present disclosure is not limited thereto. When the coating layer composition is dried, the coating layer 520 may be provided on one surface of the polarizing layer 510, for example, of the PVA-based resin film. In some embodiments, an operation of temporarily laminating a protective film on the coating layer 520 may be performed. In a process of coupling (e.g., attaching) the polarizing film 500 on the display panel, the protective film may prevent or reduce damage to the coating layer 520 of the polarizing film 500.

Meanwhile, in an embodiment, the coating layer composition forming the coating layer 520 is formed by adding an ultraviolet-ray-absorbing monomer to the PVA-based resin, which is the same material as a material forming the polarizing layer 510. Thus, when the coating layer 520 is coated on the polarizing layer 510, the coating layer 520 may be integrally provided as a single body with the polarizing layer 510. That the polarizing layer 510 and the coating layer 520 are integrally provided as a single body may refer to how the polarizing layer 510 and the coating layer 520 include the same PVA-based resin, and thus, the polarizing layer 510 and the coating layer 520 may not be recognized as substantially distinct layers from each other. However, in addition to the PVA-based resin, the coating layer 520 includes an ultraviolet-ray-absorbing monomer, which may be found through component analysis. In addition, when the second adhesive layer 120 for directly coupling (e.g., attaching) the window layer 600 on the coating layer 520 is arranged as shown in FIG. 2, 3, or the like, it may be inferred that the coating layer 520 for blocking an ultraviolet ray is on the polarizing layer 510.

Figure 9:
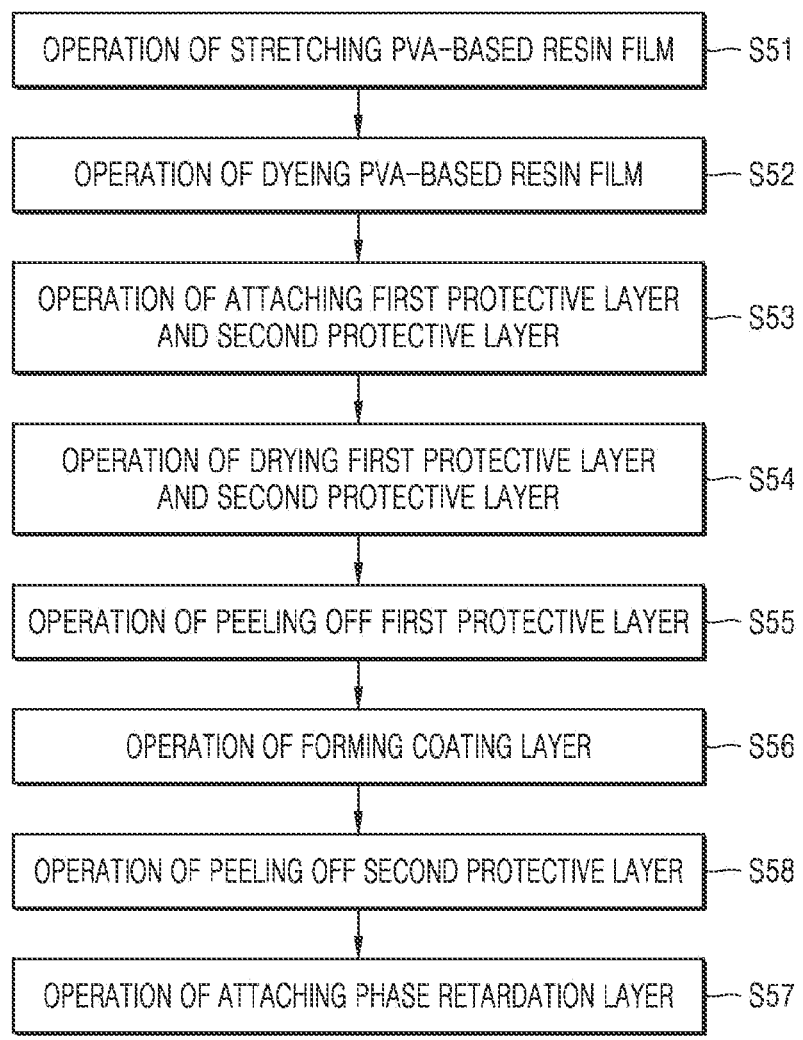
FIG. 9 is a flowchart of a method of manufacturing a polarizing film, according to an embodiment.
Figure 10:
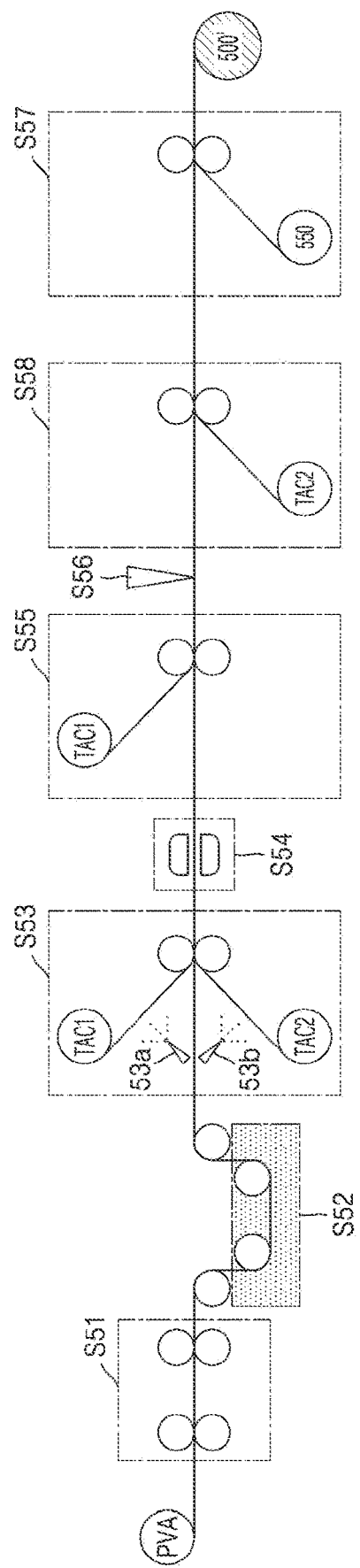
FIG. 10 is a conceptual diagram schematically illustrating a process of manufacturing a polarizing film, according to an embodiment.

FIG. 9 is a flowchart of a method of manufacturing a polarizing film, according to an embodiment, and FIG. 10 is a conceptual diagram schematically illustrating a process of manufacturing a polarizing film, according to an embodiment.

The manufacturing process shown in FIGS. 9 and 10 is substantially the same as that of FIGS. 4 and 5 described above, but differs from the above-described process in that the former further includes an operation (S58) of peeling off the second protective layer TAC2. Thus, descriptions of FIGS. 9 and 10 that overlap the descriptions of FIGS. 4 and 5 may not be repeated, and differences will be mainly described below.

Referring to FIGS. 9 and 10, an operation (S51) of stretching a PVA-based resin film and an operation (S52) of dyeing the PVA-based resin film may be performed. Then, an operation (S53) of coupling (e.g., attaching) a first protective layer TAC1 and a second protective layer TAC2 may be performed. However, the second protective layer TAC2 is removed in the manufacturing process according the present embodiment, and thus, like the first protective layer TAC1, the second protective layer TAC2 may be coupled (e.g., attached) by spraying, for example, DI water on the other surface of the PVA-based resin film through the second spray nozzle 53b and utilizing (e.g., using) the sprayed DI water as a medium. The DI water does not substantially have an adhesive force, and thus, it is easy to detach the second protective layer TAC2 in a subsequent process.

After the operation (S53) of coupling (e.g., attaching) the first protective layer TAC1 and the second protective layer TAC2, an operation (S54) of drying the first protective layer TAC1 and the second protective layer TAC2 may be performed. In this process, the DI water sprayed through the first spray nozzle 53a and the second spray nozzle 53b may be dried.

Then, an operation (S55) of peeling off the first protective layer TAC1 and an operation (S56) of forming the coating layer 520 may be sequentially performed. In this process, the second protective layer TAC2 is not removed and may support the PVA resin film from below.

After the coating layer 520 is formed, an operation (S58) of peeling off the second protective layer TAC2 may be performed. By peeling off the second protective layer TAC2, a thickness of the polarizing film 500' may be further reduced.

In another embodiment, to make the process simple, the second protective layer TAC2 may be peeled off together in the operation (S55) of peeling off the first protective layer TAC1. For example, the operation (S55) of peeling off the first protective layer TAC1 and the operation (S58) of peeling off the second protective layer TAC2 may be simultaneously or concurrently performed. In some embodiments, the operation (S55) of peeling off the first protective layer TAC1 and the operation (S58) of peeling off the second protective layer TAC2 may be simultaneously or concurrently performed, and the operation (S56) of forming the coating layer 520 may be performed after the operations (S55) and (S58) are performed.

Then, an operation (S57) of coupling (e.g., attaching) the phase retardation layer 550 on the other surface of the PVA-based resin film in the same way as in a process of FIG. 4, etc. described above may be performed.

Figure 11:
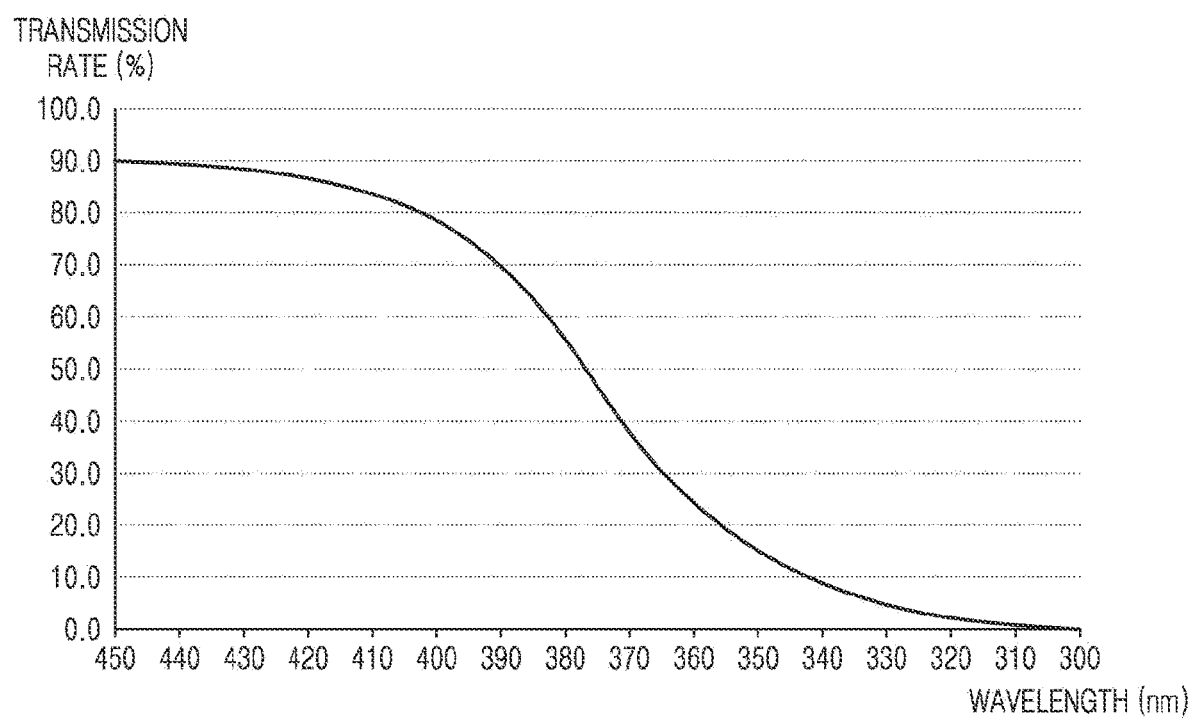
FIG. 11 is a graph showing a transmittance spectrum of an ultraviolet wavelength area of a coating layer according to an embodiment.

FIG. 11 is a graph showing a transmission spectrum of an ultraviolet ray wavelength area of a coating layer according to an embodiment.

Referring to FIG. 11, a change in transmittance, according to a wavelength, of the coating layer 520 to which an ultraviolet ray blocking effect is assigned is shown. A transmittance in the ultraviolet ray wavelength area, for example, in a wavelength area between about 350 nm to about 400 nm wavelength was measured to be about 46.1%, and a transmittance in a wavelength area of about 300 nm to 350 nm was measured to be about 5%. In addition, it may be seen that a transmittance in a wavelength area of about 300 nm or less converges to almost zero. Substantially, an ultraviolet wavelength area that affects thermal decomposition of a polarizing layer and degradation of a display layer is between about 300 nm to about 400 nm, and thus, it is very important to exhibit a blocking effect as described above, in the corresponding wavelength area.

As described above, it may be understood that even the presence of the coating layer 520, which has a small thickness of about 15 μm or less, for example, about 5 μm or less, may significantly reduce the transmittance in the ultraviolet ray wavelength area to half or less.

Figure 12:
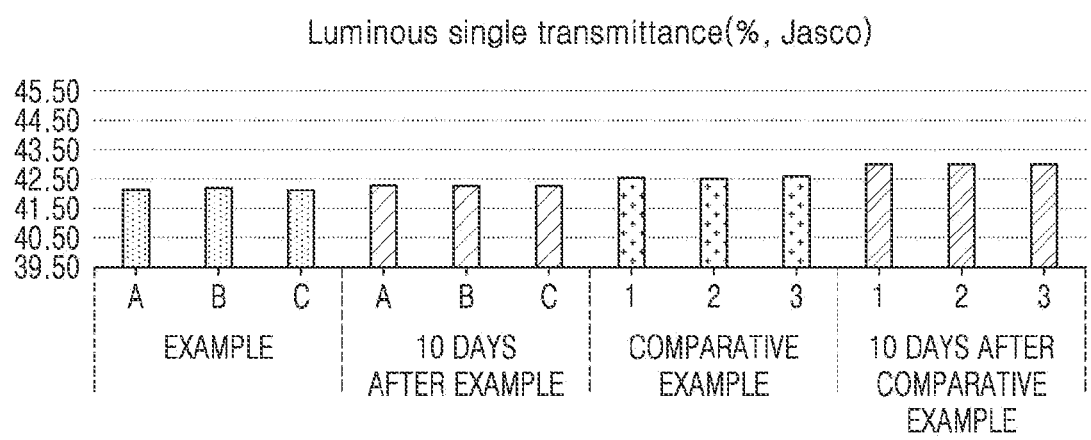
FIGS. 12 and 13 are each a graph showing a change in transmittance of sunlight exposure of a polarizing film according to an embodiment.
Figure 13:
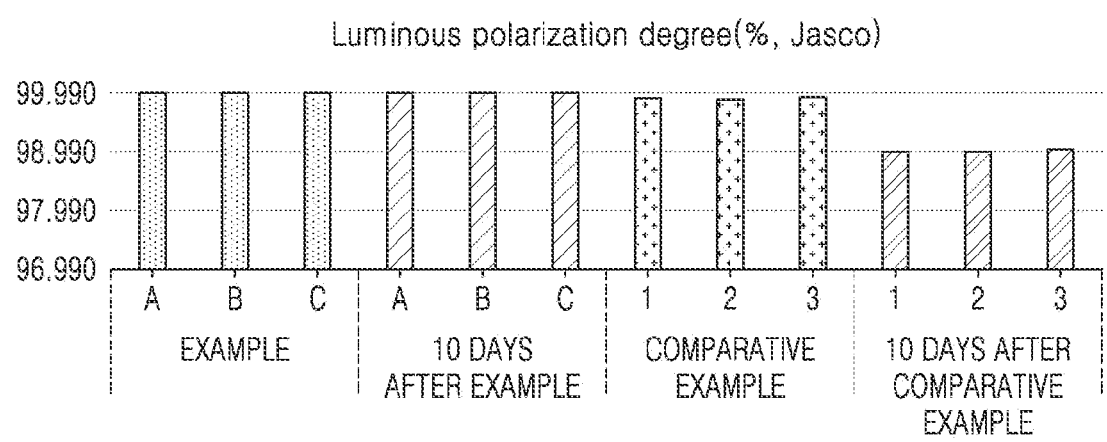
Figure 14:
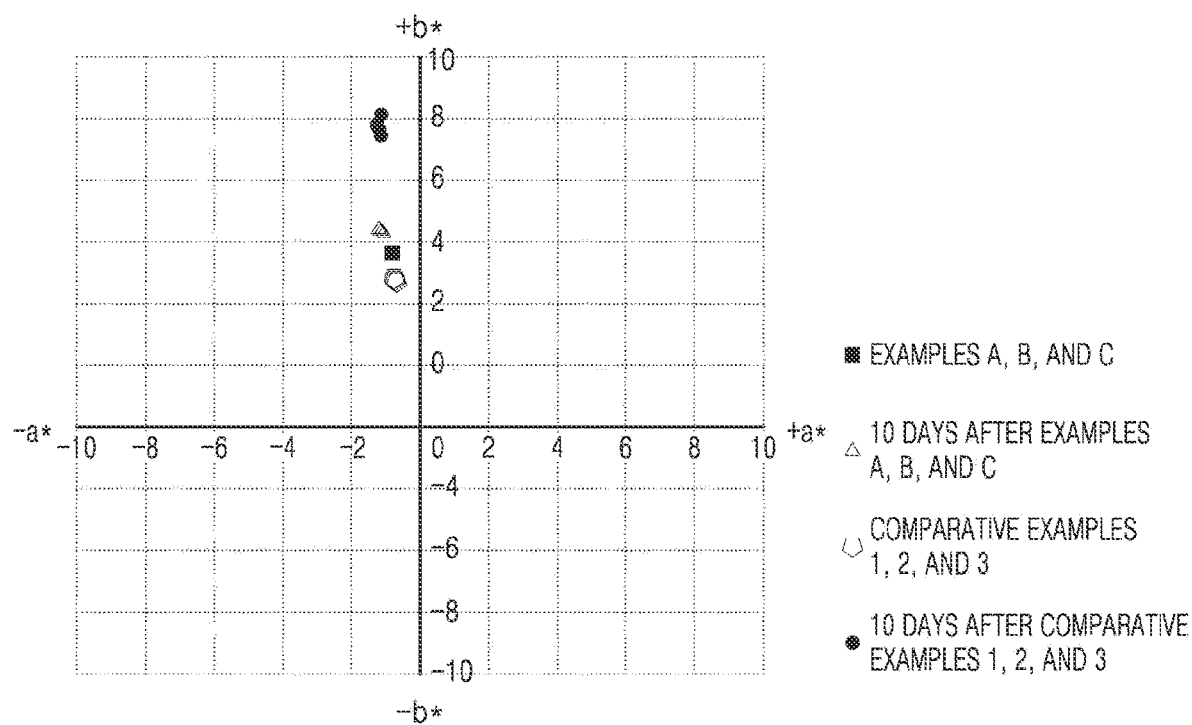
FIG. 14 is a graph that shows reflected light saturation of each of the embodiments in a CIE L*a*b* coordinate system.

FIGS. 12 and 13 are graphs showing a change in transmittance of a polarizing film when exposed to sunlight, according to an embodiment, and FIG. 14 shows a saturation of reflected light in each of the embodiments of the present disclosure on a CIE L*a*b* coordinate system.

Examples A, B, and C of FIGS. 12 to 14 are embodiments of a polarizing film having a coating layer as described above, and Comparative Examples 1, 2, and 3 are comparative examples of a polarizing film that does not have a coating layer. In FIGS. 12 to 14, a change in transmittance (sunshine meter) with respect to sunlight exposure of each of the Examples and Comparative Examples was measured.

FIG. 12 shows a luminous single transmittance. First, in Examples A, B, and C, the transmittance was measured to be about 42.2% at the time of initial measurement, and when the transmittance was measured after 10 days, the transmittance was the same as the initial measurement or slightly increased by about 0.1. On the other hand, in Examples 1, 2, and 3, it may be understood that the transmittance was measured to be about 42.5% to about 42.7% at the time of initial measurement, and that the transmittance after 10 days was about 43.2%, which is significantly greater than the initial measurement by about 0.5% to about 0.7%.

In addition, FIG. 13 shows a luminous polarization degree. In Examples A, B, and C, a polarization degree was measured to be about 99.99% which almost converges to 100%, and the polarization degree after 10 days was maintained the same at 99.99%. On the other hand, in Comparative Examples 1, 2, and 3, it may be understood that a polarization degree was measured to be about 99.89% at the time of initial measurement, and that the polarization degree after 10 days decreased by almost 1% to about 99%.

Referring to FIG. 14, the Comparative Examples to which the coating layer is not applied show that after 10 days, a coordinate of saturation of reflected light was significantly changed from about a*=−1, b*=3 to about a*=−1, b*=8, as compared with the initial measurement. On the other hand, it was found that there was little change in coordinate of saturation of reflected light of each of the example embodiments at the time of initial measurement and after 10 days. Compared with the Comparative Examples, in the Examples in which a coating layer is included, a state closest to a*=0, b*=0, which is an initial reference point, is maintained even after a time elapses, and there is little change in saturation of reflected light, and thus, an image of high quality may be displayed. For example, it was found that in the Examples in which the coating layer is included, a coordinate of saturation of reflected light was initially measured at about a*=−1, b*=4, and was again measured after 10 days at about a*=−1, b*=4.

As can be understood through the experiments of FIGS. 12 to 14 described above, a polarizing film according to an embodiment has a coating layer so that ultraviolet rays incident from sunlight may be effectively blocked. In addition, the polarizing film according to an embodiment suppresses polyenylation of a polarizing layer, for example, a PVA resin, thus maintaining a polarization of the polarizing film at about 100%. In addition, the coating layer may be formed to have a thickness of about 15 μm or less, for example, about 5 μm or less, and thus, a thickness of the polarizing film may be reduced and further, a thickness of the display apparatus may be reduced.

Figure 15:
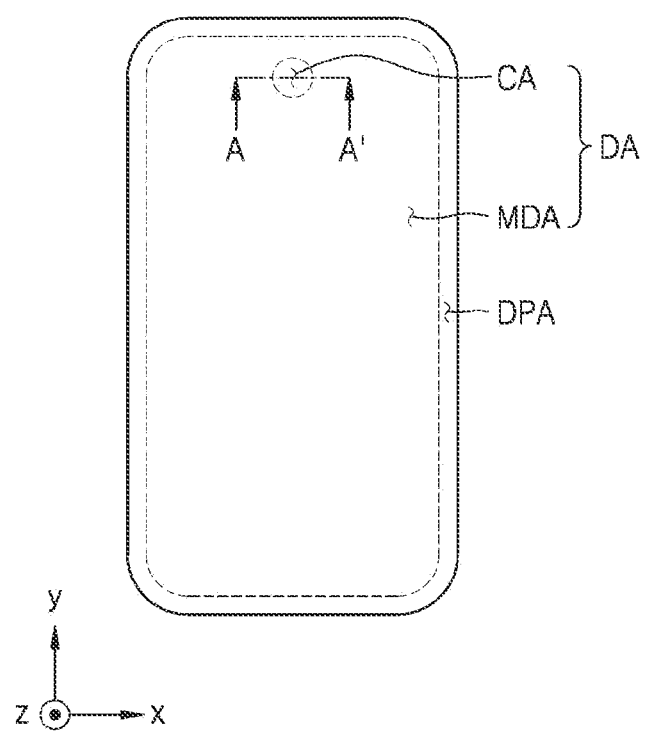
FIG. 15 is a plan view of a display apparatus according to an embodiment.
Figure 16:
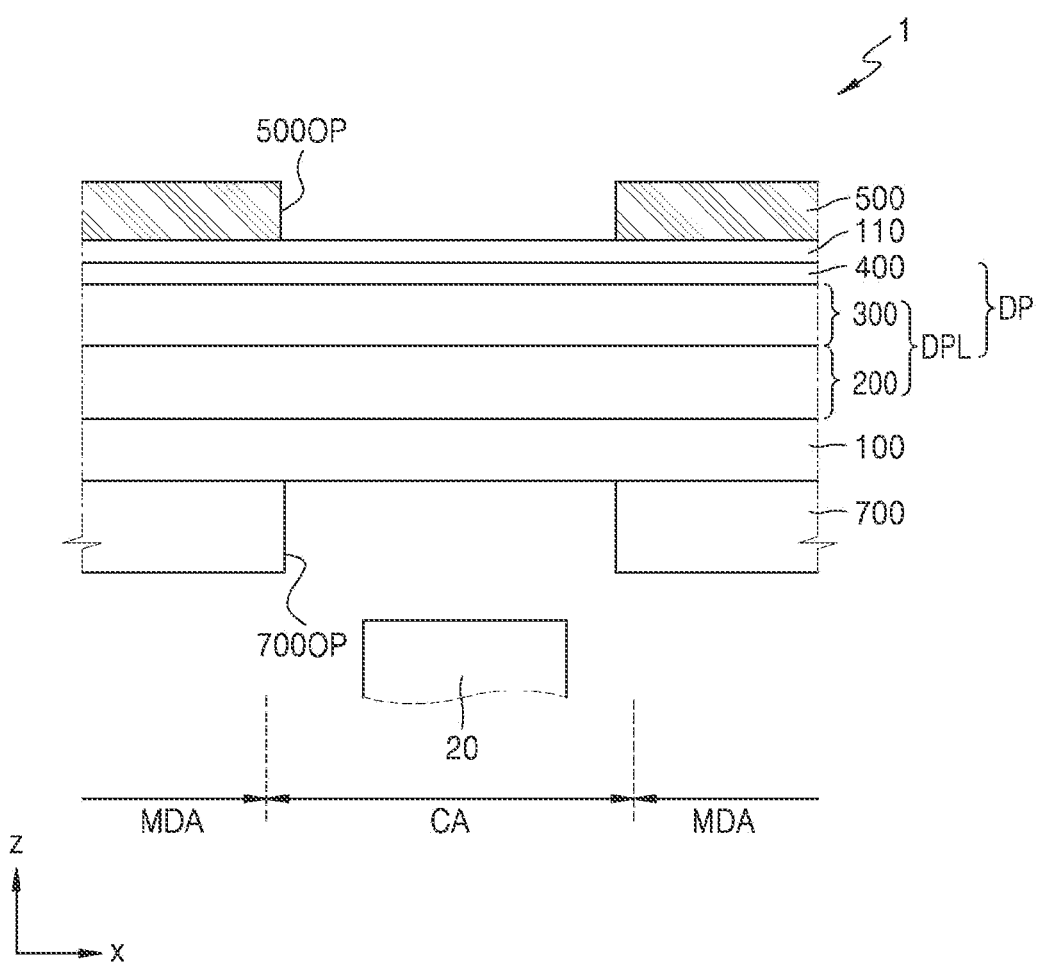
FIG. 16 is a cross-sectional view schematically illustrating a cross-section of the display apparatus, taken along line A-A' in FIG. 15.

FIG. 15 is a plan view schematically illustrating a display apparatus according to an embodiment, and FIG. 16 is a cross-sectional view of the display apparatus in FIG. 15, taken along line A-A'.

Referring to FIG. 15, the display apparatus may include a light-emitting display apparatus including a light-emitting element. For example, the display apparatus may include an organic light-emitting display apparatus utilizing (e.g., using) an organic light-emitting diode including an organic emission layer, a micro light-emitting diode display apparatus utilizing (e.g., using) a micro light-emitting diode (LED), a quantum dot light-emitting display apparatus utilizing (e.g., using) a quantum dot light emitting diode including a quantum dot emission layer, and/or an inorganic light-emitting display apparatus utilizing (e.g., using) an inorganic light-emitting device including an inorganic semiconductor.

The display apparatus may include a rigid display panel that has rigidity and thus is not easily bendable, and/or a flexible display panel that is easily bendable, foldable, and/or rollable. For example, the display apparatus may include a foldable display that is foldable and/or unfoldable, a curved display having a curved display surface, a bended display in which an area other than the display surface is bent, a rollable display that is rollable and/or unrollable, and/or a stretchable display.

The display apparatus may include a display area DA for implementing an image, and a peripheral area DPA for not implementing an image. The display area DA may include a main display area MDA and a component area CA. The main display area MDA and the component area CA may display an image individually or together. The peripheral area DPA may be a type (e.g., kind) of non-display area in which display elements are not arranged. The display area DA may be partially or entirely surrounded by the peripheral area DPA. A component, which is an electronic element, may be arranged under the component area CA.

The component may be a camera utilizing (e.g., using) infrared or visible light, and may include an image pickup device. In some embodiments, the component may include a solar battery, a flash, an illuminance sensor, a proximity sensor, and/or an iris sensor. In some embodiments, the component may have a function of receiving sound. To minimize or reduce the restriction on functions of the component as much as possible, the component area CA may include a transmission area, through which light and/or sound may pass, the light and/or the sound being output from the component to the outside or progressing toward the component from the outside.

In an embodiment, the component area CA may be an area having greater light transmittance and/or sound transmittance than the main display area MDA. In an embodiment, when light passes through the component area CA, the light transmittance may be about 10% or more, for example, about 25% or more, about 30% or more, about 50% or more, about 75% or more, about 80% or more, about 85% or more, or about 90% or more.

The component area CA may be arranged inside the main display area MDA and surrounded (e.g., partially or entirely surrounded) by the main display area MDA. In addition, the component area CA may be provided circular (e.g., may have a circular shape in a plan view), and may be provided singular or plural. In FIG. 15, only one component area CA is shown, but in another embodiment, two or more component areas CA may be included. The plurality of component areas may have different functions from each other. In an embodiment, a camera may be arranged in one component area, and an illuminance sensor, a proximity sensor, and/or the like may be arranged in the other component area.

In FIG. 15, the component area CA is circular, but the present disclosure is not limited thereto. For example, the component area CA may have an elliptical shape or a polygonal shape such as a triangular shape, a pentagonal shape, or the like, and may be of a bar-type (e.g., have bar-like shape and/or an elongated shape) that extends in one direction (e.g., an x direction), and a location and size of the component area CA may be modified in various suitable ways.

Referring to FIG. 16, the display apparatus 1 may include a display panel DP and a component 20 overlapping the display panel DP. A window layer may be further arranged on the display panel DP to protect the display panel DP.

The display panel DP may include a component area CA overlapping the component 20, and a main display area MDA in which a main image is displayed. The display apparatus 1 may include a substrate 100, the display layer DPL arranged on the substrate 100, the input detection layer 400, the polarizing film 500, and a lower film 700 arranged under the substrate 100.

The display layer DPL may include a display element layer 200 including a light-emitting element as a display element, and an encapsulation member such as a thin-film encapsulation layer 300 and/or an encapsulation substrate. In some embodiments, each of the main display area MDA and the component area CA may have a sub-pixel arranged therein.

In addition, at least a portion of the component area CA may be a transmission area, through which light or a signal emitted from the component area or light or a signal incident on the component 20 (e.g., incident from the outside on the component 20) may pass.

The display element layer 200 may be covered with the thin-film encapsulation layer 300 and/or the encapsulation substrate. In an embodiment, the thin-film encapsulation layer 300 may include at least one inorganic encapsulation layer and at least one organic encapsulation layer. When the display element layer 200 is encapsulated with an encapsulation substrate, the encapsulation substrate may face or overlap the substrate 100 with the display element layer 200 therebetween. A gap may be present between the encapsulation substrate and the display element layer 200. The encapsulation substrate may include (e.g., be) glass. A sealant including (e.g., being) frit and/or the like may be arranged between the substrate 100 and the encapsulation substrate, and the sealant may be arranged in the peripheral area DPA described above. The sealant arranged in the peripheral area DPA may surround (e.g., partially or entirely surround) the display area DA and prevent or block the penetration of moisture through a side surface of the display area DA.

The input detection layer 400 may obtain coordinate information according to an external input, for example, a touch event. The input detection layer 400 may include a touch electrode and lines coupled (e.g., connected) to the touch electrode. The input detection layer 400 may detect an external input by utilizing (e.g., using) a self-capacitance method or a mutual capacitance method.

The input detection layer 400 may be formed on the thin-film encapsulation layer 300. In some embodiments, the input detection layer 400 may be separately formed on a touch substrate, and then coupled to the thin-film encapsulation layer 300 through an adhesive layer such as an OCA. In an embodiment, the input detection layer 400 may be directly formed on the thin-film encapsulation layer 300, and in this case, the adhesive layer may not be between the input detection layer 400 and the thin-film encapsulation layer 300.

The polarizing film 500 may include an anti-reflection layer. The anti-reflection layer may reduce the reflectivity of (external) light incident toward the display apparatus 1 from the outside.

In an embodiment, the polarizing film 500 may include a polarizing film. The polarizing film 500 may have an opening 5000P corresponding to (e.g., overlapping in a plan view) some or all of the component area CA. Thus, the light transmittance of the transmission area may be remarkably improved. The opening 5000P may be filled with a transparent material such as an optically clear resin (OCR). As the polarizing film 500 has the opening 5000P, the light transmittance of the component area CA may be improved.

A window layer may be arranged on the polarizing film 500 to protect the display panel DP. The window layer may be coupled (e.g., attached) onto the polarizing film 500 by utilizing (e.g., using) the OCA.

The lower film 700 may be coupled (e.g., attached) under the substrate 100 to support and protect the substrate 100. The lower film 700 may have an opening 7000P corresponding to the component area CA. As the lower film 700 has the opening 7000P, the light transmittance of the component area CA may be improved. The lower film 700 may include (e.g., be) polyethylene terephthalate (PET) and/or polyimide (PI).

Figure 17:
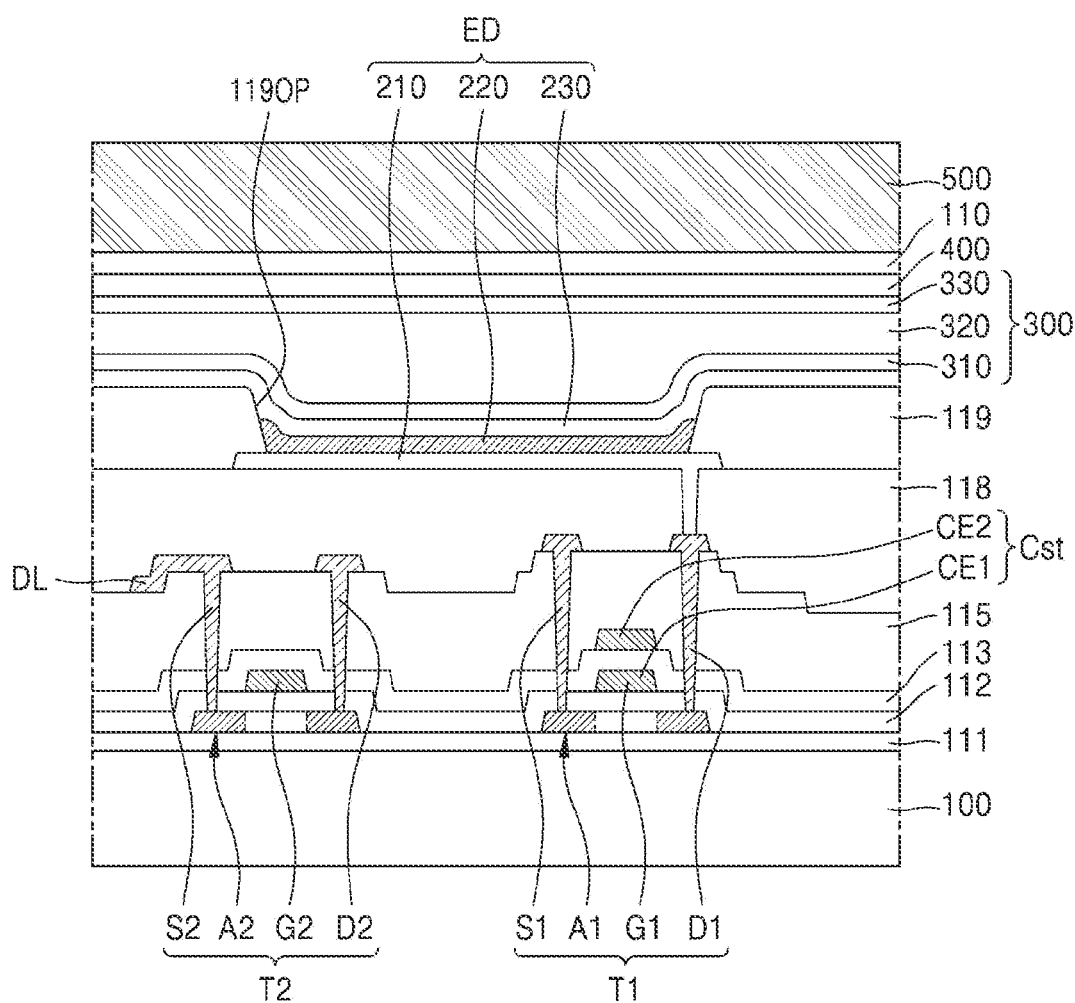
FIG. 17 is a cross-sectional view schematically illustrating a stacked structure of a portion of a display apparatus according to an embodiment.

FIG. 17 is a cross-sectional view schematically illustrating a stacked structure of a portion of a display apparatus according to an embodiment.

Referring to FIG. 17, the display apparatus may include a substrate 100, first and second thin-film transistors T1 and T2 and a storage capacitor Cst arranged on the substrate 100, and an organic light-emitting diode ED electrically coupled (e.g., electrically connected) to the first and second thin-film transistors T1 and T2. In addition, to implement the first and second thin-film transistors T1 and T2 and the storage capacitor Cst, various suitable insulating layers, for example, a buffer layer 111, a first gate insulating layer 112, a second gate insulating layer 113, an interlayer insulating layer 115, a planarization layer 118, and a pixel-defining layer 119, may be between various suitable conductive layers.

The substrate 100 may include (e.g., be) a material such as a glass material, a metal, and/or an organic material. According to an embodiment, the substrate 100 may include (e.g., be) a flexible material. For example, the substrate 100 may include (e.g., be) a polymer resin such as polyethersulfone, polyacrylate, polyetherimide, polyethylene naphthalate, PET, polyphenylene sulfide, polyarylate, PI, polycarbonate, and/or cellulose acetate propionate.

The buffer layer 111 may be positioned on the substrate 100 and reduce or block the penetration of foreign materials, moisture, and/or ambient air from under the substrate 100, and may provide a flat surface on the substrate 100. The buffer layer 111 may include (e.g., be) an inorganic material such as an oxide and/or a nitride, an organic material, and/or an organic and inorganic compound, and may have a single-layer or multi-layer structure of an inorganic material and an organic material. A barrier layer for blocking the penetration of the ambient air may be further included between the substrate 100 and the buffer layer 111. The buffer layer 111 may include (e.g., be) silicon oxide ($SiO_2$), silicon nitride ($SiN_x$), and/or silicon oxynitride (SiON).

The first thin-film transistor T1 and/or the second thin-film transistor T2 may be arranged on the buffer layer 111. The first thin-film transistor T1 may include a semiconductor layer A1, a gate electrode G1, a source electrode S1, and a drain electrode D1, and the second thin-film transistor T2 may include a semiconductor layer A2, a gate electrode G2, and a source electrode S2, and a drain electrode D2. The first thin-film transistor T1 may be coupled (e.g., connected) to the organic light-emitting diode ED and function as a driving thin-film transistor for driving the organic light-emitting diode ED. The second thin-film transistor T2 may be coupled (e.g., connected) to a data line DL and function as a switching thin-film transistor. FIG. 17 shows two thin-film transistors, but the present disclosure is not limited thereto. The number of thin-film transistors may be modified in various suitable ways, for example, one to seven thin-film transistors.

The semiconductor layers A1 and A2 may include (e.g., be) amorphous silicon and/or polycrystalline silicon. In another embodiment, the semiconductor layers A1 and A2 may include (e.g., be) an oxide of at least one material selected from the group consisting of indium (In), gallium (Ga), stannum (Sn), zirconium (Zr), vanadium (V), hafnium (Hf), cadmium (Cd), germanium (Ge), chrome (Cr), titanium (Ti), and zinc (Zn). Each of the semiconductor layers A1 and A2 may include a channel area, and a source area and a drain area doped with impurities.

The gate electrodes G1 and G2 may be arranged on the semiconductor layers A1 and A2 with the first gate insulating layer 112 therebetween. The gate electrodes G1 and G2 may include (e.g., be) molybdenum (Mo), aluminum (Al), copper (Cu), titanium (Ti), and/or the like, and may have a single-layer or multi-layer structure. For example, each of the gate electrodes G1 and G2 may be a single Mo layer.

The first gate insulating layer 112 may include (e.g., be) $SiO_2$, $SiN_x$, SiON, aluminum oxide ($Al_2O_3$), titanium oxide ($TiO_2$), tantalum oxide ($Ta_2O_5$), hafnium oxide ($HfO_2$), and/or zinc oxide (ZnO).

The second gate insulating layer 113 may cover the gate electrodes G1 and G2. The second gate insulating layer 113 may include (e.g., be) $SiO_2$, $SiN_x$, SiON, $Al_2O_3$, $TiO_2$, $Ta_2O_5$, $HfO_2$, and/or ZnO.

A first storage electrode CE1 of the storage capacitor Cst may overlap the first thin-film transistor T1. For example, the gate electrode G1 of the first thin-film transistor T1 may function as the first storage electrode CE1 of the storage capacitor Cst. In another example, the storage capacitor Cst may not overlap the first thin-film transistor T1 and may be apart from (e.g., spaced apart in a plan view from) the first and second thin-film transistors T1 and T2.

A second storage electrode CE2 of the storage capacitor Cst may overlap the first storage electrode CE1 with the second gate insulating layer 113 therebetween. In this case, the second gate insulating layer 113 may function as a dielectric layer of the storage capacitor Cst. The second storage electrode CE2 may include a conductive layer including (e.g., being) Mo, Al, Cu, Ti, and/or the like, and may have a multi-layer or a single layer structure including (e.g., being) the above-described materials. For example, the second storage electrode CE2 may include a single Mo layer or a multi-layer of a Mo layer, an Al layer, and another Mo layer.

The interlayer insulating layer 115 may be formed on an entire surface of the substrate 100 and cover the second storage electrode CE2. The interlayer insulating layer 115 may include (e.g., be) $SiO_2$, $SiN_x$, SiON, $Al_2O_3$, $TiO_2$, $Ta_2O_5$, $HfO_2$, and/or ZnO.

The source electrodes S1 and S2 and the drain electrodes D1 and D2 may be arranged on the interlayer insulating layer 115. The source electrodes S1 and S2 and the drain electrodes D1 and D2 may include (e.g., be) a conductive material including (e.g., being) Mo, Al, Cu, Ti, and/or the like, and may have a multi- or single-layer structure including (e.g., being) the materials described above. For example, the source electrodes S1 and S2 and the drain electrodes D1 and D2 may have a multi-layer structure of a Ti layer, an Al layer, and another Ti layer.

The planarization layer 118 may be positioned on the source electrodes S1 and S2 and the drain electrodes D1 and D2, and an organic light-emitting diode ED may be positioned on the planarization layer 118. The organic light-emitting diode ED may include a pixel electrode 210, an intermediate layer 220 including an organic emission layer, and an opposite electrode 230.

The planarization layer 118 may have a flat upper surface so that the pixel electrode 210 may be formed flat. The planarization layer 118 may have a single- or multi-layer structure including (e.g., being) an organic material and/or an inorganic material. The planarization layer 118 may include (e.g., be) a general-purpose polymer such as benzocyclobutene (BCB), PI, hexamethyldisiloxane (HMDSO), polymethylmethacrylate (PMMA), and/or polystyrene (PS), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and any blends or combinations thereof. Meanwhile, the planarization layer 118 may include (e.g., be) $SiO_2$, $SiN_x$, SiON, $Al_2O_3$, $TiO_2$, $Ta_2O_5$, $HfO_2$, and/or ZnO. After the planarization layer 118 is formed, a chemical-mechanical polishing may be performed to provide a flat upper surface.

The planarization layer 118 may have an opening that exposes any of the source electrode S1 and the drain electrode D1 of the first thin-film transistor T1, and the pixel electrode 210 may be in direct contact with the source electrode S1 or the drain electrode D1 through the opening and be electrically coupled (e.g., electrically connected) to the first thin-film transistor T1.

The pixel-defining layer 119 may be arranged on the pixel electrode 210 (e.g., on a side of the pixel electrode 210). The pixel-defining layer 119 has an opening 1190P corresponding to each sub-pixel, for example, the opening 1190P that exposes at least a central portion of the pixel electrode 210, thereby defining a pixel. In addition, the pixel-defining layer 119 may increase a distance between an edge of the pixel electrode 210 and the opposite electrode 230, thereby preventing or blocking an arc and/or the like from occurring between the edge of the pixel electrode 210 and the opposite electrode 230. For example, the pixel-defining layer 119 may include (e.g., be) an organic material such as PI, HMDSO, and/or the like.

A spacer may be arranged on the pixel-defining layer 119. The spacer may prevent, or reduce the occurrence of, a mask stamping that may occur in a mask process required to form the intermediate layer 220 of the organic light-emitting diode ED. The spacer may include (e.g., be) an organic material such as PI, HMDSO, and/or the like. The spacer may be simultaneously or concurrently formed with the pixel-defining layer 119 and may include (e.g., be) the same material as the pixel-defining layer 119. In this case, a halftone mask may be utilized (e.g., used).

The intermediate layer 220 of the organic light-emitting diode ED may include an organic emission layer. The organic emission layer may include (e.g., be) an organic material including (e.g., being) a fluorescent and/or phosphorescent material that emits red, green, blue, or white light. The organic emission layer may include (e.g., be) a low-molecular weight organic material and/or a polymer organic material, and optionally, a functional layer such as a hole transport layer (HTL), a hole injection layer (HIL), an electron transport layer (ETL), an electron injection layer (EIL), and/or the like may be further arranged below and above the organic emission layer. The intermediate layer 220 may be arranged to correspond to each of a plurality of pixel electrodes 210. However, the present disclosure is not limited thereto. Various suitable modifications may be made, for example, the intermediate layer 220 may include a layer that is integral over the plurality of pixel electrodes 210.

The opposite electrode 230 may include a light-transmitting electrode or a reflective electrode. In some embodiments, the opposite electrode 230 may be a transparent electrode or a semi-transparent electrode and may include a metal thin film having a low work function including (e.g., being) lithium (Li), calcium (Ca), LiF/Ca, LiF/Al, Al, Ag, Mg, and any compounds thereof. In addition, a transparent conductive oxide (TCO) film including (e.g., being) indium tin oxide (ITO), indium zinc oxide (IZO), ZnO, and/or $In_2O_3$ may be further arranged on the metal thin film. The opposite electrode 230 may be arranged over an entire surface of the display area DA, and may be arranged on the intermediate layer 220 and the pixel-defining layer 119. The opposite electrode 230 may be integrally formed as a single body with the plurality of organic light-emitting diodes ED and correspond to the plurality of pixel electrodes 210.

A thin-film encapsulation layer 300 for encapsulating the display area DA may be further arranged on the organic light-emitting diode ED. The thin-film encapsulation layer 300 may cover the display area DA and protect the organic light-emitting diode ED and/or the like from external moisture and/or oxygen. The thin-film encapsulation layer 300 may include a first inorganic encapsulation layer 310, an organic encapsulation layer 320, and a second inorganic encapsulation layer 330.

The first inorganic encapsulation layer 310 may cover the opposite electrode 230 and include (e.g., be) ceramic, metal oxide, metal nitride, metal carbide, metal oxynitride, $In_2O_3$, stannum oxide ($SnO_2$), ITO, $SiO_2$, $SiN_x$, and/or SiON. However, in some embodiments, other layers such as a capping layer and/or the like may be between the first inorganic encapsulation layer 310 and the opposite electrode 230. Because the first inorganic encapsulation layer 310 is formed along a structure therebelow, an upper surface thereof may not be flat as shown in FIG. 2.

The organic encapsulation layer 320 may cover the first inorganic encapsulation layer 310, and unlike the first inorganic encapsulation layer 310, an upper surface thereof may be substantially flat. For example, the organic encapsulation layer 320 may have a substantially flat upper surface in a portion corresponding to the display area DA. The organic encapsulation layer 320 may include (e.g., be) one or more materials selected from the group consisting of acryl, methacryl, polyester, polyethylene, polypropylene, PET, polyethylene naphthalate, polycarbonate, PI, polyethylene sulfonate, polyoxymethylene, polyarylate, and HMDSO.

The second inorganic encapsulation layer 330 may cover the organic encapsulation layer 320 and include (e.g., be)

ceramic, a metal oxide, a metal nitride, a metal carbide, a metal oxynitride, $In_2O_3$, $SnO_2$, ITO, $SiO_2$, $SiN_x$, and/or SiON. The second inorganic encapsulation layer 330 may be in direct contact with the first inorganic encapsulation layer 310 at an edge thereof located outside the display area DA, thereby preventing the organic encapsulation layer 320 from being exposed to the outside or reducing the exposure of the organic encapsulation layer 320 to the outside. For example, the first and second inorganic encapsulation layers 310 and 330 may encapsulate the organic encapsulation layer 320.

As described above, the thin-film encapsulation layer 300 includes the first inorganic encapsulation layer 310, the organic encapsulation layer 320, and the second inorganic encapsulation layer 330, and thus, even when a crack occurs within the thin-film encapsulation layer 300 through the multi-layer structure, the cracks may be prevented or blocked from being coupled (e.g., connected) to each other between the first inorganic encapsulation layer 310 and the organic encapsulation layer 320 and between the organic encapsulation layer 320 and the second inorganic encapsulation layer 330. Therefore, the formation of a passage through which external moisture or oxygen penetrates into the display area DA may be prevented or reduced.

Meanwhile, in the present embodiment, the thin-film encapsulation layer 300 is shown as an encapsulation member for encapsulating the organic light-emitting diode ED, but the present disclosure is not limited thereto. For example, an encapsulation substrate bonded to the substrate 100 by a sealant and/or frit may be utilized (e.g., used) as a member for encapsulating the organic light-emitting diode ED.

In the present embodiment, a polarizing film 500 for improving the outdoor visibility may be arranged on the thin-film encapsulation layer 300 or the encapsulation substrate. As shown in FIG. 2, the polarizing film 500 may include a coating layer 520 on the polarizing layer 510. In addition, instead of the polarizing film 500 of FIG. 2, the polarizing film 500' shown in FIG. 3 may be applied.

As described above, an input detection layer 400, a first adhesive layer 110 for coupling (e.g., attaching) the polarizing film 500, and/or the like may be further between the polarizing film 500 and the thin-film encapsulation layer 300.

According to an embodiment described above, a display apparatus including a polarizing film having excellent ultraviolet ray blocking effect and capable of implementing a thin display apparatus, a method of manufacturing the polarizing film, and a polarizing member manufactured utilizing (e.g., using) the same may be implemented. However, the scope of the present disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various suitable changes in form and details may be made therein without departing from the spirit and scope as defined by the following claims and equivalents thereof.

What is claimed is:

1. A display apparatus comprising:
a display panel comprising a display element;
an input detection layer on the display panel;
a polarizing film on the input detection layer;
a window layer on the polarizing film;
a first adhesive layer between the input detection layer and the polarizing film; and
a second adhesive layer between the polarizing film and the window layer,
wherein the polarizing film comprises:
a polarizing layer;
a coating layer directly on one side of the polarizing layer and defining an outer surface of the polarizing film, the coating layer being to absorb wavelengths in an ultraviolet ray region;
a protective layer directly on another side of the polarizing layer and comprising an organic material;
a phase retardation layer at one side of the protective layer opposite to the polarizing layer; and
an adhesive film directly between the protective layer and the phase retardation layer, and including a pressure-sensitive adhesive,
wherein the coating layer and the polarizing layer are separate components, and during a manufacturing process, the coating layer is formed by being directly applied on the polarizing layer after the polarizing layer has been formed,
wherein the coating layer includes a poly vinyl alcohol-based resin and an ultraviolet-ray-absorbing monomer,
wherein the coating layer has a thickness of about 15 nm to about 1 µm,
wherein the second adhesive layer is a pressure-sensitive adhesive directly between the coating layer and the window layer, and
wherein a transmittance of the coating layer in a wavelength area between about 300 nm to about 400 nm is less than 50%.

2. The display apparatus of claim 1, wherein only the coating layer is between the second adhesive layer and the polarizing layer.

3. The display apparatus of claim 1, wherein the ultraviolet-ray-absorbing monomer comprises at least one selected from a benzotriazole-based monomer, a triphenyl-triazine-based monomer, and a benzophenone-based monomer.

4. The display apparatus of claim 1, wherein the coating layer comprises about 0.1 to about 20 parts by weight of a sum of the poly vinyl alcohol-based resin and the ultraviolet-ray-absorbing monomer based on 100 parts by weight of a coating layer composition for forming the coating layer.

5. The display apparatus of claim 1, wherein the window layer defines an outer surface of the display apparatus, and the second adhesive layer is directly between the coating layer and the window layer.

* * * * *